(12) United States Patent
Koka et al.

(10) Patent No.: US 8,280,251 B2
(45) Date of Patent: Oct. 2, 2012

(54) DATA TRANSMISSION USING DIRECT AND INDIRECT OPTICAL PATHS

(75) Inventors: Pranay Koka, Austin, TX (US); Herbert Dewitt Schwetman, Jr., Austin, TX (US); Xuezhe Zheng, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 772 days.

(21) Appl. No.: 12/426,844

(22) Filed: Apr. 20, 2009

(65) Prior Publication Data

US 2010/0266277 A1    Oct. 21, 2010

(51) Int. Cl.
    H04J 14/00    (2006.01)
(52) U.S. Cl. .......................................... 398/45; 398/51
(58) Field of Classification Search ............... 398/45–95
    See application file for complete search history.

(56) References Cited

U.S. PATENT DOCUMENTS

| | | | |
|---|---|---|---|
| 4,580,872 A | 4/1986 | Bhatt et al. | |
| 4,809,264 A | 2/1989 | Abraham et al. | |
| 5,541,914 A | 7/1996 | Krishnamoorthy et al. | |
| 5,602,663 A | 2/1997 | Hamaguchi et al. | |
| 5,742,585 A * | 4/1998 | Yamamoto et al. | 370/223 |
| 5,943,150 A | 8/1999 | Deri et al. | |
| 6,021,263 A * | 2/2000 | Kujoory et al. | 709/232 |
| 6,289,021 B1 | 9/2001 | Hesse | |
| 6,633,542 B1 * | 10/2003 | Natanson et al. | 370/235 |
| 6,665,495 B1 * | 12/2003 | Miles et al. | 398/54 |
| 6,873,796 B1 * | 3/2005 | Nakahira | 398/51 |
| 7,403,473 B1 | 7/2008 | Mehrvar et al. | |
| 7,804,504 B1 | 9/2010 | Agarwal | |
| 2003/0214962 A1 | 11/2003 | Allaye-Chan et al. | |
| 2004/0037558 A1 * | 2/2004 | Beshai | 398/57 |
| 2009/0046572 A1 * | 2/2009 | Leung | 370/216 |
| 2011/0103799 A1 * | 5/2011 | Shacham et al. | 398/115 |

OTHER PUBLICATIONS

Wang, H., Petracca, M., Biberman, A., Lee, B. G., Carloni, L. P., Bergman, K., "Nanophotonic Optical Interconnection Network Architecture for On-Chip and Off-Chip Communications", Department of Electrical Engineering, Columbia University, OFC/NFOEC 2008, Feb. 24, 2008, 3 pages.

Chae, C., Wong, E., and Tucker, R. S., "Optical CSMA/CD Media Access Scheme for Ethernet Over Passive Optical Network", IEEE Photonic Technology Letters, May 2002, 3 pages.

Desai, B. N., "An Optical Implementation of a Packet-Based (Ethernet) MAC in a WDM Passive Optival Network Overlay", Mar. 2001, 3 pages.

(Continued)

*Primary Examiner* — Kenneth N Vanderpuye
*Assistant Examiner* — Abbas H Alagheband
(74) *Attorney, Agent, or Firm* — Osha Liang LLP

(57) ABSTRACT

A system for transmitting data, including: a transmitter node having a setup path packet and multiple data packets; a receiver node connected to the transmitter node by a first optical channel (OC); and a first intermediate node having a first forwarding module and connected to the transmitter node by a second OC and to the receiver node by a third OC, where the transmitter node transmits the setup path packet and a first subset of the multiple data packets to the first intermediate node using the second OC, where the first forwarding module relays, in response to receiving the setup packet, the first subset to the receiver node by switching the first subset from the second OC to the third OC, and where the receiver node receives a second subset of the multiple data packets from the transmitter node using the first OC.

18 Claims, 5 Drawing Sheets

OTHER PUBLICATIONS

Qin, X., and Yang, Y., "Nonblocking WDM Switching Networks with Full and Limited Wavelength Conversion", IEEE Transactions on Communications, Dec. 2002, 10 pages.

Shacham, A., Bergman, K., and Carloni, L. P., "On the Design of a Photonic Network-on-Chip", First International Symposium on Networks-on-Chip, May 2007, 12 pages.

Yang, Y., and Wang, J., "Designing WDM Optical Interconnects with Full Connectivity by Using Limited Wavelength Conversion", IEEE Transactions on Computers, Dec. 2004, 10 pages.

Krishnamoorthy, A. V., Ho, R., Zheng, X., Schwetman, H., Lexau, J., Koka, P., Li, G., Shubin, I., Cunningham, J. E., "Computer Systems Based on Silicon Photonic Interconnections" Proceedings of the IEEE, vol. 97, No. 7, Jul. 2009, 25 pages.

Vantrease, D., et al. "Corona:System Implications for Emerging Nanophotonic Technology", International Symposium on Computer Architecture, IEEE, Jun. 2008, 12 pages.

Batten, C., et al., "Building Manycore Processor-to-DRAM Networks with Monolithic Silicon Photonics", Proceedings of the 16th Symposium on High Performance Interconnects (HOTI-16) Aug. 2008, 10 pages.

* cited by examiner

DATA TRANSMISSION USING DIRECT AND INDIRECT OPTICAL PATHS

STATEMENT REGARDING FEDERALLY SPONSORED RESEARCH OR DEVELOPMENT

This invention was made with Government Support under Agreement No. HR0011-0 8-9-0001 awarded by DARPA. The Government has certain rights in the invention.

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place a different set of constraints on designers. For example, because each processor may be working on an independent task, more requests to memory, or other processors, may need to be issued. It may also be necessary to share information among the processors. Accordingly, the input/output ("I/O") bandwidth requirements for a system with multiple processors may be much higher than for a single processor system.

SUMMARY OF THE INVENTION

In general, in one aspect, the invention relates to a system for transmitting data. The system comprises a transmitter node comprising a setup path packet and a plurality of data packets; a receiver node operatively connected to the transmitter node by a first optical channel (OC); and a first intermediate node comprising a first forwarding module and operatively connected to the transmitter node by a second OC and to the receiver node by a third OC, wherein the transmitter node is configured to transmit the setup path packet and a first subset of the plurality of data packets to the first intermediate node using the second OC, wherein the first forwarding module is configured to relay, in response to receiving the setup packet, the first subset to the receiver node by switching the first subset from the second OC to the third OC, and wherein the receiver node is configured to receive a second subset of the plurality of data packets from the transmitter node using the first OC.

In general, in one aspect, the invention relates to a method of transmitting data. The method comprises transmitting a setup path packet from a transmitter node to a first intermediate node comprising a first forwarding module using a first optical channel (OC), wherein the first OC operatively connects the transmitter node and the first intermediate node; transmitting a first subset of a plurality of data packets from the transmitter node to the first intermediate node using the first OC after transmitting the setup path packet; transmitting a second subset of the plurality of data packets from the transmitter node to a receiver node using a second OC, wherein the second OC operatively connects the transmitter node to the receiver node; and relaying the first subset, in response to receiving the setup path packet, to the receiver node by switching the first subset from the first OC to a third OC at the first forwarding module, wherein the third OC operatively connects the first intermediate node and the receiver node, wherein the first OC, the third OC, and the first intermediate node form an indirect optical channel after transmitting the setup path packet.

Other aspects of the invention will be apparent from the following description and the appended claims.

DETAILED DESCRIPTION

Figure 1:
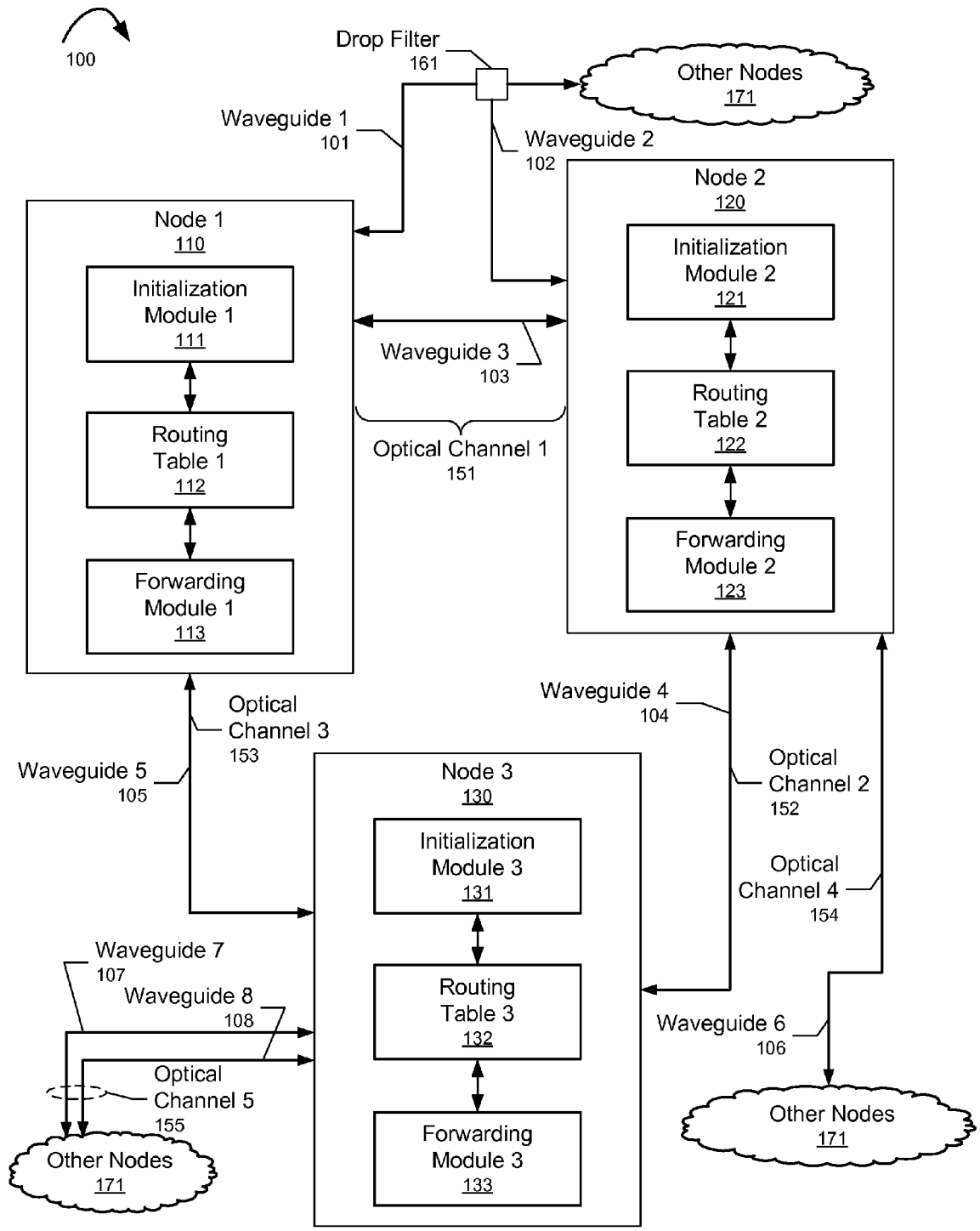
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a system and method for transmitting data (e.g., data packets) between two nodes using a direct optical path and one or more indirect optical paths. The one or more indirect optical paths may be temporary, and thus created before data transmission is initiated and/or terminated after data transmission is completed using control signals (e.g., control packets).

FIG. 1 shows a system (100) in accordance with one or more embodiments of the invention. As shown in FIG. 1, the system (100) includes multiple nodes (e.g., Node 1 (110), Node 2 (120), Node 3 (130), Other Nodes (171)) interconnected using multiple optical channels (i.e., Optical Channel 1 (151), Optical Channel 2 (152), Optical Channel 3 (153), Optical Channel 4 (154), Optical Channel 5 (155)). Accordingly, each node is configured to exchange signals (e.g., data packets, control packets) with other nodes using one or more of the optical channels (151, 152, 153, 154, 155). For example, Node 1 (110) is configured to transmit signals to Node 2 (120) using Optical Channel 1 (151). Further, Node 1 (110) is configured to receive signals from Node 2 (120) using Optical Channel 1 (151). The nodes and the optical channels are further discussed below.

In one or more embodiments of the invention, each node (e.g., Node 1 (110), Node 2 (120), Node 3 (130)) is a die having one or more processors and one or more cache memories. Further, all nodes may be disposed on a single chip (i.e., a macrochip) as part of a larger mesh structure. In one or more embodiments of the invention, the optical channels (151, 152, 153, 154, 155) are part of a silicon photonic network connecting the multiple nodes disposed on the single chip.

In one or more embodiments of the invention, each optical channel (151, 152, 153, 154, 155) includes one or more waveguides (i.e., Waveguide 1 (101), Waveguide 2 (102), Waveguide 3 (103), Waveguide 4 (104), Waveguide 5 (105), Waveguide 6 (106), Waveguide 7 (107), Waveguide 8 (108)) for propagating signals. For example, Optical Channel 1 (151) includes three waveguides (i.e., Waveguide 1 (101), Waveguide 2 (102), Waveguide 3 (103)) for propagating signals between Node 1 (110) and Node 2 (120). Within a given waveguide, the signals may be propagated on a single wavelength or on multiple wavelengths with the use of a multiplexing scheme.

In one or more embodiments of the invention, the multiple waveguides of an optical channel are connected using a drop filter. For example, Optical Channel 1 (151) includes Drop Filter (161) for connecting Waveguide 1 (101) and Waveguide 2 (102). The Drop Filter (161) is configured to select a signal having a predetermined wavelength (e.g., $\lambda_A$) (or a signal having a wavelength falling within a small predetermined wavelength range) from Waveguide 1 (101), and reroute (i.e., drop) the selected signal into Waveguide 2 (102).

In one or more embodiments of the invention, a direct optical path between two nodes (e.g., a transmitting node, a receiving node) exists if the transmitting node and the receiving node can exchange signals (e.g., data packets) without the use of any additional nodes. Further, a direct optical path may be implemented using an optical channel having one or more waveguides, with or without drop filters. For example, a direct optical path between Node 1 (110) and Node 3 (130) is implemented using Optical Channel 3 (153). Similarly, a direct optical path between Node 1 (110) and Node 2 (120) is implemented using Optical Channel 1 (151), having Waveguide 1 (101), Waveguide 2 (102), and Drop Filter (161). A direct optical path may be referred to as a point-to-point connection.

In one or more embodiments of the invention, an indirect optical path exists between two nodes (e.g., a transmitting node, a receiving node) if the transmitting node and the receiving node make use of at least one intermediate node to exchange signals (e.g., data packets). The one or more intermediate nodes effectively relay the signals between the transmitting node and the receiving node. For example, an indirect optical path between Node 1 (110) and Node 3 (130) may be implemented using Optical Channel 1 (151), Optical Channel 2 (152), and Node 2 (120) as an intermediate node. In other words, Node 2 (120), Optical Channel 1 (151), and Optical Channel 2 (152) may be used to relay signals between Node 1 (110) and Node 3 (130). Similarly, an indirect optical path between Node 2 (120) and Node 3 (130) may be implemented using Optical Channel 1 (151), Optical Channel 3 (153), and Node 1 (110) as an intermediate node.

Those skilled in the art, having the benefit of this detailed description, will appreciate that the bandwidth of a direct optical path between a transmitting node and a receiving node is fixed. Those skilled in the art, having the benefit of this detailed description, will also appreciate that by establishing one or more indirect optical paths between the transmitting node and the receiving node (in addition to the direct optical path), the overall bandwidth between the transmitting node and the receiving node is increased.

In one or more embodiments of the invention, each node (i.e., Node 1 (110), Node 2 (120), Node 3 (130)) includes an initialization module (i.e., Initialization Module 1 (111), Initialization Module 2 (121), Initialization Module 3 (131)) for use in setting up an indirect optical path between the node having the initialization module and a receiver node. For example, Initialization Module 3 (131) is configured to set up an indirect optical path between Node 3 (130), acting as the transmitter node, and a receiver node. The initialization module transmits a control packet (e.g., a setup path packet), identifying the receiver node, to the selected intermediate node in order to establish the indirect optical path. Accordingly, the initialization module may access a routing table (e.g., Routing Table 1 (112), Routing Table 2 (122), Routing Table 3 (132)) to identify the locations of all nodes in the system and the interconnecting optical channels. In addition, the initialization module may also access a routing table (112, 122, 132) to identify the location of any drop filters (e.g., Drop Filter (161)) in the system, and the wavelengths necessary to make use of the drop filters. In order to establish multiple indirect optical paths, the initialization module may transmit multiple setup path packets, each identifying the receiver node, to the selected multiple intermediate nodes.

In one or more embodiment of the invention, the initialization module (i.e., Initialization Module 1 (111), Initialization Module 2 (121), Initialization Module 3 (131)) is configured to terminate an indirect optical path by transmitting a control packet (e.g., a break path packet) to the intermediate node in the indirect optical path. Like the setup path packet, the break path packet may identify the receiver node in the indirect optical path. In the event of multiple indirect paths, the initialization module may transmit multiple break path packets to the multiple intermediate nodes.

In one or more embodiments of the invention, an initialization module (i.e., Initialization Module 1 (111), Initialization Module 2 (121), Initialization Module 3 (131)) is configured to partition a group of data packets in the transmitter node into multiple distinct subsets, where each subset is destined for transmission to the receiver node using the direct optical path and/or an indirect optical path. In one or more embodiments of the invention, each subset is of equal size (i.e., the same number of data packets). In one or more embodiments of the invention, the subset destined for transmission using the direct optical path has more packets than any individual subset destined for transmission using an indirect optical path.

In one or more embodiments of the invention, each node (i.e., Node 1 (110), Node 2 (120), Node 3 (130)) includes a forwarding module (i.e., Forwarding Module 1 (113), Forwarding Module 2 (123), Forwarding Module 3 (133)) for relaying data packets received from a transmitter node to a receiver node. Accordingly, the forwarding module in an intermediate node is active while a forwarding module in a transmitter node or a receiver node might not be active. In one or more embodiments of the invention, the forwarding module establishes the indirect optical path in accordance with a setup path packet received from the transmitter node. In other words, the forwarding module is able to identify the transmitter node of the indirect optical path, the receiver node of the indirect optical path, and the desire to initiate the indirect optical path by examination of the setup path packet and/or extraction of data from the setup path packet.

In one or more embodiments of the invention, the forwarding module (113, 123, 133) is configured to transmit a control packet (e.g., an acknowledgement packet) to the transmitter node once the indirect optical path is established and ready to relay packets. The forwarding module (113, 123, 133) may also be configured to terminate the indirect optical path upon receipt of a break path packet from the transmitter node. Like the initialization modules (111, 121, 131), the forwarding module (113, 123, 133) may access a routing table (112, 122, 132) to identify the locations of all nodes in the system and the interconnecting optical channels. In addition, the forwarding module (113, 123, 133) may also access a routing table (112, 122, 132) to identify the location of any drop filters (e.g., Drop Filter (161)) in the system, and the wavelengths necessary to properly make use of the or more drop filters when relaying data packets received from the transmitter node to the receiver node.

In one or more embodiments of the invention, the forwarding module (i.e., Forwarding Module 1 (112), Forwarding Module 2 (122), Forwarding Module 3 (132)) includes an optical switching array (not shown) for each optical channel arriving at the intermediate node (e.g., an optical channel connecting the transmitter node to the intermediate node). The optical switching array is used to transfer (i.e., switch) an incoming data packet to one of the multiple optical channels leaving the intermediate node (e.g., an optical channel connecting the intermediate node to the receiver node). Accordingly, the optical switching array may be used by the intermediate node to relay a data packet received from a transmitter node to a receiver node. In one or more embodiments of the invention, the relay process does not change the wavelength on which a data packet is transmitted.

In one or more embodiments of the invention, the output optical channel of an intermediate node is selected by applying a unique voltage to the optical switching array. As a setup path packet identifies the receiver node in an indirect optical path, the required output optical channel connecting the intermediate node to the receiver node may be identified and/or extracted from the setup path packet. Accordingly, the predetermined voltage needed for application to the optical switching array to select the identified output optical channel, may also be identified and/or extracted from the setup path packet.

Although embodiments of the invention have focused on a system comprising three nodes, those skilled in the art, having the benefit of this detailed description, will appreciate that a system may have any number of nodes (e.g., 25 nodes, 64 nodes, 10000 nodes, etc.). Further, although embodiments of the invention have focused on a single indirect optical path between a transmitter node and a receiver node, those skilled in the art, having the benefit of this detailed description, will appreciate that any number of indirect optical paths (e.g., 2 indirect optical paths, 8 indirect optical paths, etc.) may be established between a transmitter node and a received node.

Figure 2:
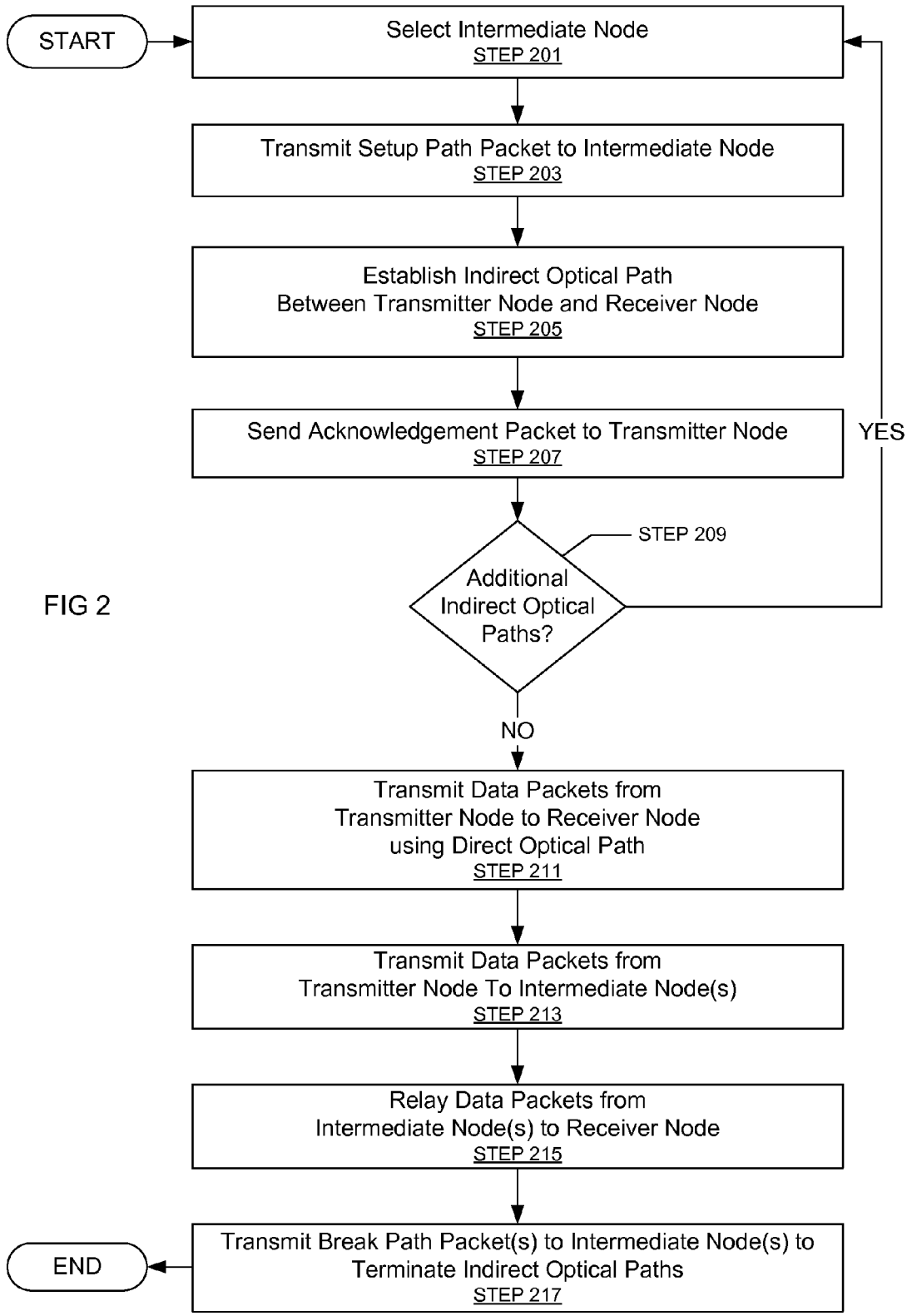
FIG. 2 shows a flowchart in accordance with one or more embodiments of the invention.

FIG. 2 shows a flowchart in accordance with one or more embodiments of the invention. The process shown in FIG. 2 may be used for transmitting data packets between a transmitter node and a receiver node using a direct optical link and one or more indirect optical links. Those skilled in the art, having the benefit of this detailed description, will appreciate that the sequence of steps shown in FIG. 2 may differ among embodiments of the invention, and that one or more of the steps shown in FIG. 2 may be repeated or omitted.

Initially, an intermediate node is selected (STEP 201). The selected intermediate node is needed to create an indirect optical link between the transmitter node and the receiver node. Specifically, the selected intermediate node is required to relay data packets received from the transmitter node to the receiver node. In one or more embodiments of the invention, the intermediate node is selected because of its proximity to the receiver node. In one or more embodiments of the invention, the intermediate node is selected because a direct optical path exists between the transmitter node and the selected intermediate node (i.e., a point-to-point connection exists between the transmitter node and the selected intermediate node). The intermediate node may also be selected because a direct optical path exists between the selected intermediate node and the receiver node (i.e., a point-to-point connection exists between the selected intermediate node and the receiver node).

In STEP 203, a setup path packet is transmitted to the intermediate node. The setup path packet indicates to the intermediate node that an indirect optical path is required between the transmitter node and a receiver node. The selected intermediate node is configured to extract the identity of the receiver node from the setup path packet. The identity of the receiver node may be stored in the header of the setup path packet. Alternatively, the identity of the receiver node may be stored in the payload of the setup path packet. In one or more embodiments of the invention, the setup path packet is generated and/or transmitted by the initiation module of the transmitter node.

In STEP 205, an indirect optical path is established between the transmitter node and the receiver node using the intermediate node. In one or more embodiments of the invention, establishing the indirect optical path includes applying a predetermined voltage to an optical switching array in the intermediate node. As discussed above, the optical switching array is capable of transferring (i.e., switching) an input signal (e.g., data packets) from the optical channel linking the transmitter node to the intermediate node ("channel T") to the optical channel linking the intermediate node to the receiver node ("channel R"). Accordingly, once the identity and/or location of the receiver node is extracted from the setup path packet (STEP 203), the correct optical channel of the multiple optical channels leaving the intermediate node (channel R) can be identified, and the corresponding predetermined voltage applied to the optical switching array.

In STEP 207, an acknowledgement packet is sent from the intermediate node to the transmitter node. The acknowledgement packet signals to the transmitter node that the optical indirect channel is established and ready to transmit data packets to the receiver node using the selected intermediate node. In one or more embodiments of the invention, the acknowledgement packet is generated by a forwarding module of the intermediate node and received by the initialization module of the transmitter node (i.e., the initialization module continually monitors for the acknowledgment packet).

In STEP 209, it is determined whether additional indirect optical paths between the transmitter node and the received node need to be established. When it is determined that additional indirect optical paths need to be established, the process returns to STEP 201. When it is determined that no additional indirect optical paths need to be establish, the process proceeds to STEP 211. In one or more embodiments of the invention, any number of indirect optical paths may be established between the transmitter node and the receiver node.

In STEP 211, some of the data packets are transmitted from the transmitter node to the receiver node using the direct optical path. Prior to the transmission of the data packets, the multiple data packets may be partitioned into subsets, with one subset destined for transmission on the direct optical path and the remaining one or more subsets destined for transmission using the one or more indirect optical paths. For example, the multiple data packets may be partitioned into subsets of equal size. Alternatively, the subset destined for the direct optical path may be the largest subset. In one or more embodiments of the invention, when the direct optical path linking the transmitter node and the receiver node includes a drop filter, the transmitter node must transmit the corresponding subset of data packets using a wavelength that the drop filter is configured to select and drop (discussed above).

In STEP 213, one or more subsets of data packets are transmitted to the intermediate nodes. As discussed above, the optical channel connecting the transmitter node with an intermediate node is part of an indirect optical path. Similar to the case of the direct optical path, when the optical channel between the transmitter node and an intermediate node includes a drop filter, the transmitter node must transmit the subset of data packets using a wavelength that the drop filter is configured to select and drop (discussed above).

In STEP 215, the data packets are relayed from the one or more intermediate nodes to the receiver node. As discussed above, the optical channel connecting an intermediate node and the receiver node ("channel R") is part of an indirect optical path. As also discussed above, each intermediate node may include one or more optical switching arrays. Accordingly, the data packets may arrive from the transmitter node at the input of an optical switching array. As a result of the predetermined voltage applied to the optical switching array (discussed above), the incoming data packets are then propagated onto channel R.

In STEP 217, one or more break path packets are sent to the intermediate nodes to terminate the indirect optical paths between the transmitter node and the receiver node. In one or more embodiments of the invention, terminating an indirect optical path having an intermediate node includes removing or changing the voltage being applied to an optical switching array in the intermediate node. All indirect optical paths between the transmitter node and the receiver node may be terminated at the same time. Alternatively, the indirect optical paths between the transmitter node and the receiver node may be terminated on a case by case basis (i.e., each indirect optical path terminated independently of any other indirect optical path).

Although embodiments of the invention have focused on transmitting data packets using the direct optical path before transmitting data packets using the indirect optical data path, those skilled in the art, having the benefit of this detailed description, will appreciate that transmitting the data packets using the direct optical path may be initiated at any time (e.g., before the indirect optical paths are established, before intermediate nodes are identified, etc.), once it is determined which data packets are to be transmitted using the direct optical path and which data packets are to be transmitted using the one or more indirect optical paths.

Figure 3:
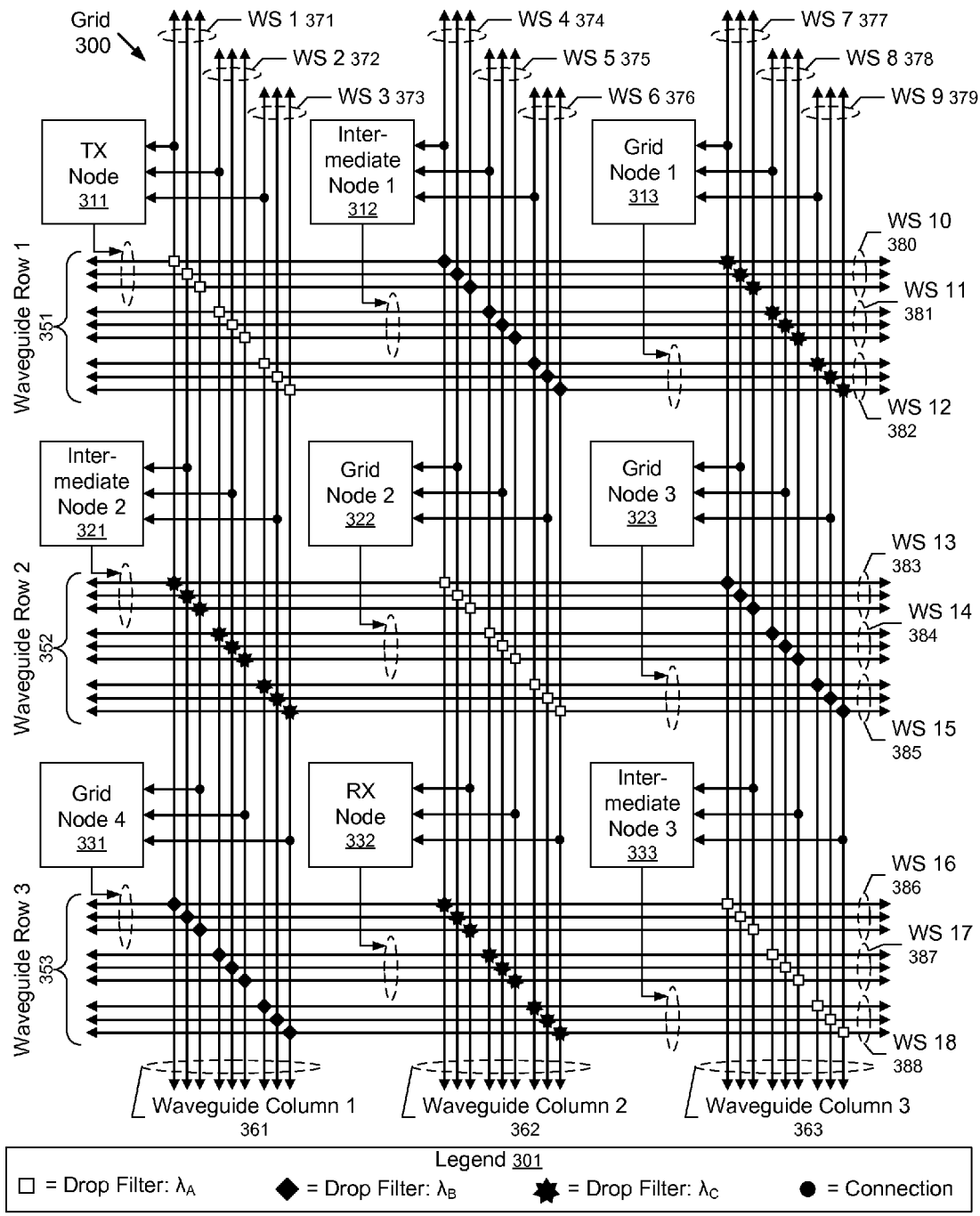
FIG. 3 and FIG. 4 show examples in accordance with one or more embodiments of the invention.

FIG. 3 shows an example in accordance with one or more embodiments of the invention. As shown in FIG. 3, a grid (300) includes a transmitting node (i.e., TX Node (311)), a receiving node (i.e., RX Node (332)), multiple intermediate nodes (i.e., Intermediate Node 1 (312), Intermediate Node 2 (321), Intermediate Node 3 (333)), and one or more other grid nodes (i.e., Grid Node 1 (313), Grid Node 2 (322), Grid Node 3 (323), Grid Node 4 (331)). Each of the nodes (311, 312, 313, 321, 322, 323, 331, 332, 333) is essentially the same as Node 1 (110), discussed above in reference to FIG. 1. Further, the grid (300) having the nodes (311, 312, 313, 321, 322, 323, 331, 332, 333) may be located on a single integrated circuit (e.g., a single chip).

As also shown in FIG. 3, the grid (300) includes multiple waveguide rows (e.g., Waveguide Row 1 (351), Waveguide Row 2 (352), Waveguide Row 3 (353)) and multiple waveguide columns (i.e., Waveguide Column 1 (361), Waveguide Column 2 (362), Waveguide Column 3 (363)). Each waveguide row (351, 352, 353) and each waveguide column (361, 362, 363) includes multiple waveguide sets. For example, Waveguide Row 1 (351) includes three waveguide sets (i.e., WS 10 (380), WS 11 (381), WS 12 (382)). Similarly, Waveguide Row 2 (352) includes three waveguide sets (i.e., WS 13 (383), WS 14 (384), WS 15 (385)). Further still, Waveguide Row 3 (353) includes three waveguide sets (e.g., WS 16 (386), WS 17 (387), WS 18 (388)). As yet another example, Waveguide Column 1 (361) includes WS 1 (371), WS 2 (372), and WS 3 (373). Further, Waveguide Column 2 (362) includes WS 4 (374), WS 5 (375), WS 6 (376). Further still, Waveguide Column 3 (363) includes WS 7 (377), WS 8 (378), WS 9 (379). All waveguide sets (371, 372, 373, 374, 375, 376, 377, 378, 379, 380, 381, 382, 383, 384, 385, 386, 387, 388) include three waveguides and each waveguide is configured to carry one or more signals (e.g., packets) of different wavelengths (e.g., $\lambda_A$, $\lambda_B$, $\lambda_C$).

As shown in FIG. 3, there exists nine drop filters at the intersection of a waveguide row and a waveguide column (e.g., the intersection of Waveguide Row 1 (351) and Waveguide Column 1 (361)). Each drop filter selects a signal having a predetermined wavelength from a waveguide belonging to the waveguide row, and reroutes (i.e., drops) the selected signal into a waveguide belonging to the waveguide column. In the example of FIG. 3, drop filters denoted as white squares select and drop signals of wavelength $\lambda_A$. Further, drop filters denoted as solid black diamonds select and drop signals of wavelength $\lambda_B$. Further still, drop filters denoted as solid black stars select and drop signals of wavelength $\lambda_C$. Accordingly, a signal of wavelength $\lambda_A$ propagating on the uppermost (i.e., top) waveguide of WS 10 (380) would be selected and dropped into the leftmost waveguide of WS 1 (371). As another example, a signal of wavelength $\lambda_B$ propagating on the lowest (i.e., bottom) waveguide of WS 15 (385) would be selected and dropped into the rightmost waveguide of WS 9 (379). As yet another example, a signal of wavelength $\lambda_C$ propagating on the middle waveguide of WS 17 (387) would be selected and dropped into the middle waveguide of WS 5 (375).

In grid (300), each node is configured to transmit signals (e.g., control packets, data packets) on any of the three waveguides in a designated waveguide set. For example, TX Node (311) is configured to transmit signals on any of the three waveguides in WS 10 (380). Further, Intermediate Node 3 (333) is configured to transmit signals on any of the three waveguides in WS 18 (388). Further still, Grid Node 2 (322) is configured to transmit signals on any of the three waveguides in WS 14 (384). In one or more embodiments of the invention, no two nodes in the same row transmit signals using the same waveguide set. For example, TX Node (311), Intermediate Node 1 (312), and Grid Node 1 (313) all belong to the same row of nodes. Further, WS 10 (380), WS 11 (381), and WS 12 (382) all belong to Waveguide Row 1 (351). However, as shown in FIG. 3, TX Node (311) transmits signals using WS 10 (380), Intermediate Node 1 (312) transmits using WS 11 (381), and Grid Node 1 (313) transmits using WS 12 (382).

Still referring to grid (300), each node is also configured to receive signals (e.g., control packets, data packets) from one waveguide in each waveguide set of a designated waveguide column. For example, Intermediate Node 1 (312) is configured to receive signals from the leftmost waveguide in WS 4 (374), the leftmost waveguide in WS 5 (375), and the leftmost waveguide in WS 6 (376). Further, Grid Node 2 (322) is configured to receive signals from the middle waveguide of WS 4 (374), the middle waveguide of WS 5 (375), and the middle waveguide of WS 6 (375). Further still, RX Node (332) is configured to receive signals from the rightmost waveguide of WS 4 (374), the rightmost waveguide of WS 5 (375), and the rightmost waveguide of WS 6 (376). In one or more embodiments of the invention, no two nodes in the same column receive signals from the same waveguide.

As a result of the configuration of grid (300) (e.g., the type and placement of drop filters, the connections between nodes and waveguides, etc.), a direct optical path (i.e., a point-to-point optical connection) exists between any two nodes in the grid (300). However, in order for the direct optical path to be realized, the signal must be transmitted on a specific waveguide using a specific wavelength. For example, a direct optical path exists between TX Node (311) and RX Node (332). This direct optical path is utilized if the TX Node (311) transmits signals of wavelength $\lambda_B$ on the bottom waveguide of WS 10 (380). Further, a direct optical path exists between Intermediate Node 3 (333) and RX Node (332). This direct optical path is realized if Intermediate Node 3 (333) transmits signals of wavelength $\lambda_C$ on the bottom waveguide of WS 18 (388). Further still, a direct optical path exists between Intermediate Node 2 (321) and RX Node (332). This direct optical path is realized if Intermediate Node 2 (321) transmits signals of wavelength $\lambda_A$ on the bottom waveguide of WS 13 (383). As a final example, a direct optical path exists between Intermediate Node 1 (312) and RX Node (332). This direct optical path is realized if Intermediate Node 1 (312) transmits signals of wavelength $\lambda_B$ on the bottom waveguide of WS 11 (381).

In the example of FIG. 3, TX Node (311) has multiple data packets for transmission to RX Node (332). In order to increase the bandwidth between TX Node (311) and RX Node (332), TX Node (311) transmits at least one subset of the multiple data packets using the direct optical path between TX Node (311) and RX Node (332), and one or more subsets of the multiple data packets using one or more indirect optical paths between TX Node (311) and RX Node (332). As shown in FIG. 3, some nodes of the grid (300) are selected as intermediate nodes for the multiple indirect optical paths between TX Node (311) and RX Node (332). Specifically, TX Node (311) has selected Intermediate Node 1 (312), Intermediate Node 2 (321), and Intermediate Node 3 (333).

In one or more embodiments of the invention, TX Node (311) sends multiple setup path packets to the multiple intermediate nodes using different wavelengths on specific waveguides. The setup path packets may identify the RX Node (332). The selected wavelengths and waveguides utilize the direct optical paths between TX Node (311) and the intermediate nodes (312, 321, 333). For example, TX Node (311) transmits a setup path packet to Intermediate Node 1 (312) using the uppermost (i.e., top) waveguide of WS 10 (380) and a signal wavelength of $\lambda_B$. Similarly, TX Node (311) transmits a setup path packet to Intermediate Node 2 (321) using the middle waveguide of WS 10 (380) and a signal wavelength of $\lambda_A$. Further still, TX Node (311) transmits a setup path packet to Intermediate Node 3 (333) using the bottom waveguide of WS 10 (380) and a signal wavelength of $\lambda_C$.

In one or more embodiments of the invention, a node is eligible to be an intermediate node when both the direct optical connection between the TX Node (311) and the proposed intermediate node, and the direct optical connection between the proposed intermediate node and the RX Node (332), require the same wavelength. For example, as discussed above, a wavelength of $\lambda_A$ is required to utilize the direct optical link between the TX Node (311) and the Intermediate Node 2 (321). However, the $\lambda_A$ wavelength is also required to utilize the direct optical connection between Intermediate Node 2 (321) and RX Node (332). As another example, the wavelength $\lambda_C$ is required to utilize the direct optical link between the TX Node (311) and the Intermediate Node 3 (333). However, the $\lambda_C$ wavelength is also required to utilize the direct optical link between Intermediate Node 3 (333) and the RX Node (332).

As discussed above, an intermediate node (312, 321, 333) includes multiple optical switching arrays (not shown). Specifically, there is one optical switching array for each optical channel arriving at the intermediate node (312, 321, 333). In response to receiving a setup path packet on an incoming optical channel, the intermediate node (312, 321, 333): (i) identifies the RX Node (332) from the setup path packet; (ii) identifies the direct optical channel linking the intermediate node and the RX Node (332) (e.g., from a routing table internal to the intermediate node); and (iii) applies, to the optical switching array corresponding to the incoming optical channel, a voltage such that the direct optical channel linking the intermediate node and the RX Node (332) is selected as the output of the optical switching array. For example, upon receiving a setup path packet from TX Node (311), Intermediate Node 2 (321) would apply a voltage to the appropriate optical switching array selecting the bottom waveguide of WS 13 (383) as the output of the optical switching array. As discussed above, the bottom waveguide of WS 13 (383) is part of the direct optical channel between Intermediate Node 2 (321) and RX Node (332).

After applying the appropriate voltages to the optical switching arrays, the intermediate nodes (312, 321, 333) transmit acknowledgement packets to the TX Node (311). Specifically, the intermediate nodes (312, 321, 333) transmit acknowledgement packets to TX Node (311) utilizing the direct optical paths between the intermediate nodes (312, 321, 333) and the TX Node (311). For example, Intermediate Node 3 (333) may transmit an acknowledgement packet to TX Node (311) using a signal of wavelength $\lambda_B$ on the uppermost (i.e., top) waveguide of WS 18 (388). Similarly, Intermediate Node 2 (321) may transmit an acknowledgement packet to TX Node (311) using a signal of wavelength $\lambda_C$ on the uppermost (i.e., top) waveguide of WS 13 (383).

In response to receiving the acknowledgment packets, the TX Node (311) transmits the subsets of data packets to the intermediate nodes (312, 321, 333) for relay (i.e., using the optical switching arrays in the intermediate nodes (312, 321, 333)) to the RX Node (332). The TX Node (311) may also transmit a subset of data packets to the RX Node (332) using the direct optical path between the TX Node (311) and the RX Node (332). Once transmission is complete, the TX Node (311) may terminate the indirect optical paths by issuing break path packets to the intermediate nodes (312, 321, 333).

Although the grid (300) in FIG. 3 is a 3×3 grid, a grid may take on any size. In general, an N×N grid like the one shown in FIG. 3 includes $N^2$ nodes arranged in N rows and N columns. There are N waveguide rows and N waveguide columns interconnecting the $N^2$ nodes. Each of the N waveguide rows includes N waveguide sets having N waveguides. Similarly, each of the N waveguide columns includes N waveguide sets having N waveguides. Thus, with one drop filter at each intersection, there are $N^4$ drop filters total. Each waveguide may be configured to carry at least N wavelengths, and each of the nodes may be statically assigned some set of the N wavelengths to communicate with other nodes. Those skilled in the art, having the benefit of this detailed description, will appreciate that by using the configuration shown in FIG. 3, there exists N intermediate nodes and thus N indirect optical channels between a TX node (e.g., TX Node (311)) and a RX node (e.g., RX Node (332)).

Figure 4:
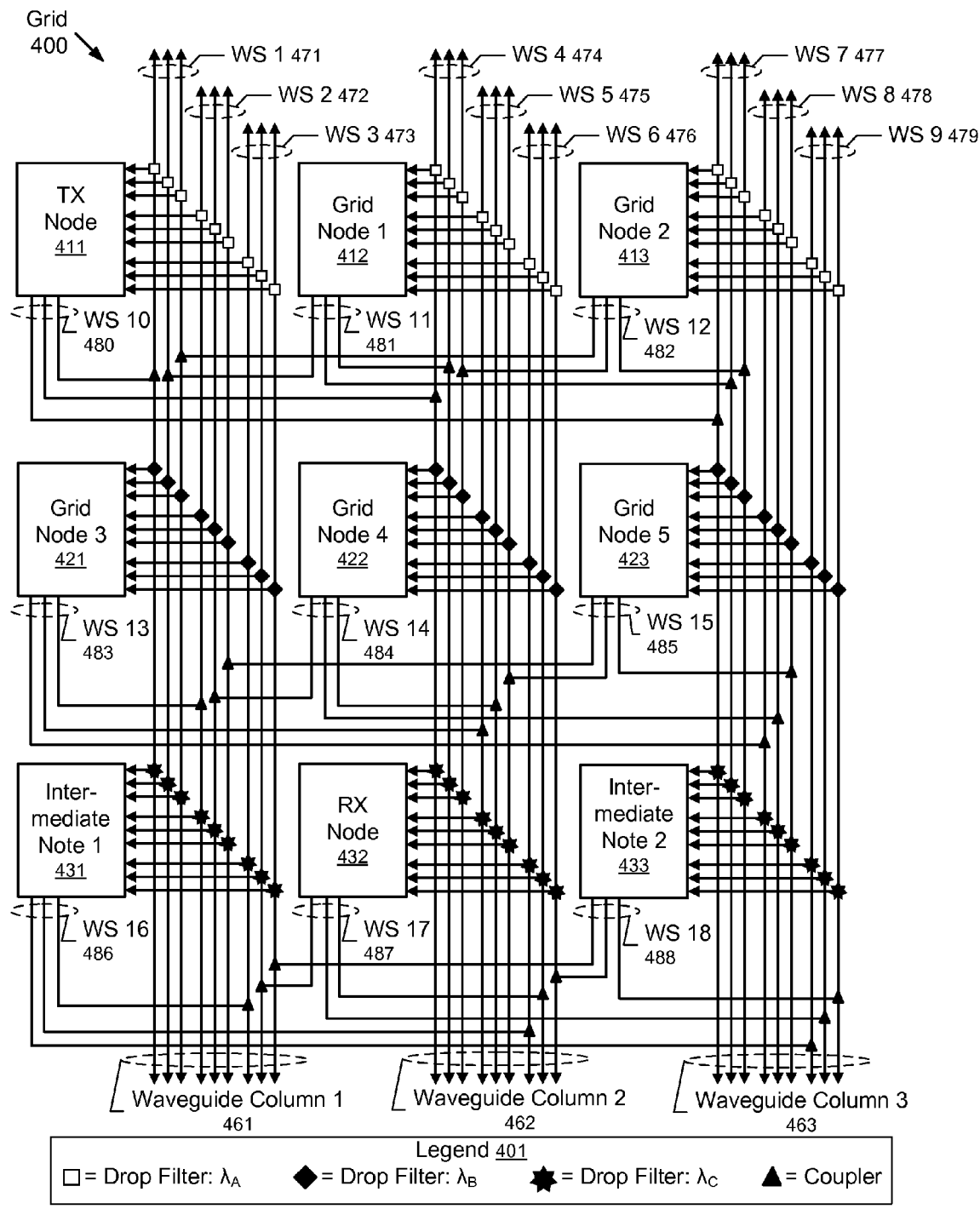

FIG. 4 shows an example in accordance with one or more embodiments of the invention. As shown in FIG. 4, a grid (400) includes a transmitting node (i.e., TX Node (411)), a receiving node (i.e., RX Node (432)), multiple intermediate nodes (i.e., Intermediate Node 1 (431), Intermediate Node 2 (433)), and one or more additional grid nodes (i.e., Grid Node 1 (412), Grid Node 2 (413), Grid Node 3 (421), Grid Node 4 (422), Grid Node 5 (423)). Each of the nodes (411, 412, 413, 421, 422, 423, 431, 432, 433) is essentially the same as Node 1 (110), discussed above in reference to FIG. 1. Further, the grid (400) having the nodes (411, 412, 413, 421, 422, 423, 431, 432, 433) may be located on a single integrated circuit (e.g., a single chip).

As also shown in FIG. 4, the grid (400) includes multiple waveguide columns (e.g., Waveguide Column 1 (461), Waveguide Column 2 (462), Waveguide Column 3 (463)).

Each waveguide column (461, 462, 463) includes three waveguide sets. For example, Waveguide Column 1 (461) includes WS 1 (471), WS 2 (472), and WS 3 (473). Further, Waveguide Column 2 (462) includes WS 4 (474), WS 5 (475), and WS 6 (476). Further still, Waveguide Column 3 (463) includes WS 7 (477), WS 8 (478), and WS 9 (479). The grid has additional waveguide sets (e.g., WS 10 (480), WS 11 (481), WS 12 (482), WS 13 (483), WS 14 (484), WS 15 (485), WS 16 (486), WS 17 (487), WS 18 (488)) that do not belong to any one of the waveguide columns. Each waveguide set (471, 472, 473, 474, 475, 476, 477, 478, 479, 480, 481, 482, 483, 484, 485, 486, 487, 488) includes three waveguides, and each waveguide is configured to carry signals (e.g., control packets, data packets) of one or more wavelengths (e.g., $\lambda_A$, $\lambda_B$, $\lambda_C$).

In the example of FIG. 4, each node is configured to transmit signals using the waveguides of a specific waveguide set. For example, TX Node (411) is configured to transmit signals using the three waveguides of WS 10 (480). Similarly, Grid Node 5 (423) is configured to transmit signals using the waveguides of WS 15 (485). Further, each waveguide used by a node for transmission is connected (i.e., using a coupler) to a waveguide in a waveguide column (461, 462, 463). For example, the waveguides of WS 14 (484) are used by Grid Node 4 (422) to transmit signals. Accordingly, each waveguide of WS 14 (484) is connected to a waveguide in one waveguide column. One waveguide of WS 14 (484) is connected to a waveguide in Waveguide Column 1 (461) (i.e., the middle waveguide of WS 2 (472)). Another waveguide of WS 14 (484) is connected to a waveguide in Waveguide Column 2 (462) (i.e., the middle waveguide of WS 5 (475)). Yet another waveguide of WS 14 (484) is connected to a waveguide of Waveguide Column 3 (463) (i.e., the middle waveguide of WS 8 (478)).

As shown in FIG. 4, each node receives signals from the waveguides in a waveguide column through multiple drop filters. Specifically, each drop filter selects a signal having a predetermined wavelength from a waveguide in the waveguide column, and reroutes (i.e., drops) the selected signal to the node. For example, in the case of RX Node (432), multiple drop filters select signals of wavelength $\lambda_C$ traveling along the waveguides of Waveguide Column 2 (462), and reroute the selected signals to RX Node (432). As another example, in the case of Grid Node 5 (423), multiple drop filters select signal of wavelength $_B$ traveling along the waveguides of Waveguide Column 3 (463), and reroute the selected signals to Grid Node 5 (423). As shown in FIG. 4, all nodes in the same row make use of the same type of drop filter. For example, Intermediate Node 1 (431), Intermediate Node 2 (433), and RX Node (432) all belong to the same row. Accordingly, Intermediate Node 1 (431), Intermediate Node 2 (433), and RX Node (432) all make use of the same type of drop filters (i.e., drop filters configures to select and drop signals of wavelength $\lambda_C$). As also shown in FIG. 4, no two nodes in the same column make use of the same type of drop filter. For example, TX Node (411), Grid Node 3 (421), and Intermediate Node 1 (431) all belong to the same column. However, TX Node (411), Grid Node 3 (421), and Intermediate Node 1 (431) all use different types of drop filters (i.e., TX Node 1 (411) uses drop filters that select and drop signals of wavelength $\lambda_A$, Grid Node 3 (421) uses drop filters that select and drop signals of wavelength $\lambda_B$, and Intermediate Node 1 (431) uses drop filters that select and drop signals of wavelength $\lambda_C$).

As a result of the configuration of grid (400) (e.g., the type and placement of drop filters, the connections between nodes and waveguides, etc.), a direct optical path (i.e., a point-to-point optical connection) exists between any two nodes in the grid (400). However, in order for the direct optical path to be realized, the signal must be transmitted on a specific waveguide using a specific wavelength. For example, a direct optical path exists between TX Node (411) and RX Node (432). This direct optical path is utilized if the TX Node (411) transmits signals of wavelength $\lambda_C$ on the middle waveguide of WS 10 (480). Further, a direct optical path exists between Intermediate Node 1 (431) and RX Node (432). This direct optical path is realized if Intermediate Node 1 (431) transmits signals of wavelength $\lambda_C$ on the middle waveguide of WS 16 (486). Further still, a direct optical path exists between Intermediate Node 2 (433) and RX Node (432). This direct optical path is realized if Intermediate Node 2 (433) transmits signals of wavelength $\lambda_C$ on the middle waveguide of WS 18 (488).

In the example of FIG. 4, TX Node (411) has multiple data packets for transmission to RX Node (432). In order to increase the bandwidth between TX Node (411) and RX Node (432), TX Node (411) transmits at least one subset of the multiple data packets using the direct optical path between TX Node (411) and RX Node (432), and one or more subsets of the multiple data packets using one or more indirect optical paths between TX Node (411) and RX Node (432). As shown in FIG. 4, some nodes of the grid (400) are selected as intermediate nodes for the multiple indirect optical paths between TX Node (411) and RX Node (432). Specifically, TX Node (411) has selected Intermediate Node 1 (431) and Intermediate Node 2 (433).

In one or more embodiments of the invention, TX Node (411) sends multiple setup path packets to the multiple intermediate nodes using different wavelengths on specific waveguides. The setup path packets may identify the RX Node (432). The selected wavelengths and waveguides utilize the direct optical paths between TX Node (411) and the intermediate nodes (431, 433). For example, TX Node (411) transmits a setup path packet to Intermediate Node 1 (431) using the rightmost waveguide of WS 10 (480) and a signal wavelength of $\lambda_C$. Similarly, TX Node (411) transmits a setup path packet to Intermediate Node 2 (433) using the leftmost waveguide of WS 10 (480) and a signal wavelength of $\lambda_C$.

In one or more embodiments of the invention, a node is eligible to be an intermediate node when both the direct optical connection between the TX Node (411) and the proposed intermediate node, and the direct optical connection between the proposed intermediate node and the RX Node (432), require the same wavelength. In the case of FIG. 4, this corresponds to all nodes that are in the same row as the RX Node (432).

As discussed above, an intermediate node (431, 433) includes multiple optical switching arrays (not shown). Specifically, there is one optical switching array for each optical channel arriving at the intermediate node (431, 433). In response to receiving a setup path packet on an incoming optical channel, the intermediate node (431, 433): (i) identifies the RX Node (432) from the setup path packet; (ii) identifies the direct optical channel linking the intermediate node and the RX Node (432) (e.g., from a routing table internal to the intermediate node); and (iii) applies, to the optical switching array corresponding to the incoming optical channel, a voltage such that the direct optical channel linking the intermediate node and the RX Node (432) is selected as the output of the optical switching array. For example, upon receiving a setup path packet from TX Node (411), Intermediate Node 1 (431) would apply a voltage to the appropriate optical switching array selecting the middle waveguide of WS 16 (486) as the output of the optical switching array. As discussed above, the middle waveguide of WS 16 (486) is part of the direct optical channel between Intermediate Node 1 (431) and RX Node (432).

After applying the appropriate voltages to the optical switching arrays, the intermediate nodes (431, 433) transmit acknowledgement packets to the TX Node (411). Specifically, the intermediate nodes (431, 433) transmit acknowledgement packets to TX Node (411) utilizing the direct optical paths between the intermediate nodes (431, 433) and the TX Node (411). For example, Intermediate Node 2 (433) may transmit an acknowledgement packet to TX Node (411) using a signal of wavelength $\lambda_A$ on the leftmost waveguide of WS 18 (488). Similarly, Intermediate Node 1 (431) may transmit an acknowledgement packet to TX Node (411) using a signal of wavelength $\lambda_A$ on the rightmost waveguide of WS 16 (486).

In response to receiving the acknowledgment packets, the TX Node (411) transmits the subsets of data packets to the intermediate nodes (431, 433) for relay (i.e., using the optical switching arrays in the intermediate nodes (431, 433)) to the RX Node (432). The TX Node (410) may also transmit a subset of data packets to the RX Node (432) using the direct optical path between the TX Node (411) and the RX Node (432). Once transmission is complete, the TX Node (411) may terminate the indirect optical paths by issuing break path packets to the intermediate nodes (431, 433).

Although the grid (400) in FIG. 4 is a 3×3 grid, a grid may take on any size. In general, an N×N grid like the example in FIG. 4, includes $N^2$ nodes arranged in N rows and N columns. There are N waveguide columns, each having $N^2$ waveguides, connected to one or more of the $N^2$ nodes. Specifically, each of the $N^2$ nodes transmits to one waveguide in each of the N waveguide columns. However, a node may connect to all $N^2$ waveguides in a waveguide column using $N^2$ drop filters. As shown in FIG. 4, no two nodes in the same column make use of the same type of drop filter. However, all nodes in the same row use the same type of drop filter. Each waveguide may be configured to carry at least N wavelengths, and each of the nodes may be statically assigned some set of the N wavelengths to communicate with other nodes. Those skilled in the art, having the benefit of this detailed description, will appreciate that by using the configuration shown in FIG. 4, there exists N-1 intermediate nodes and thus N-1 indirect optical channels between a TX node (e.g., TX Node (411)) and a RX node (e.g., RX Node (432)).

Figure 5:
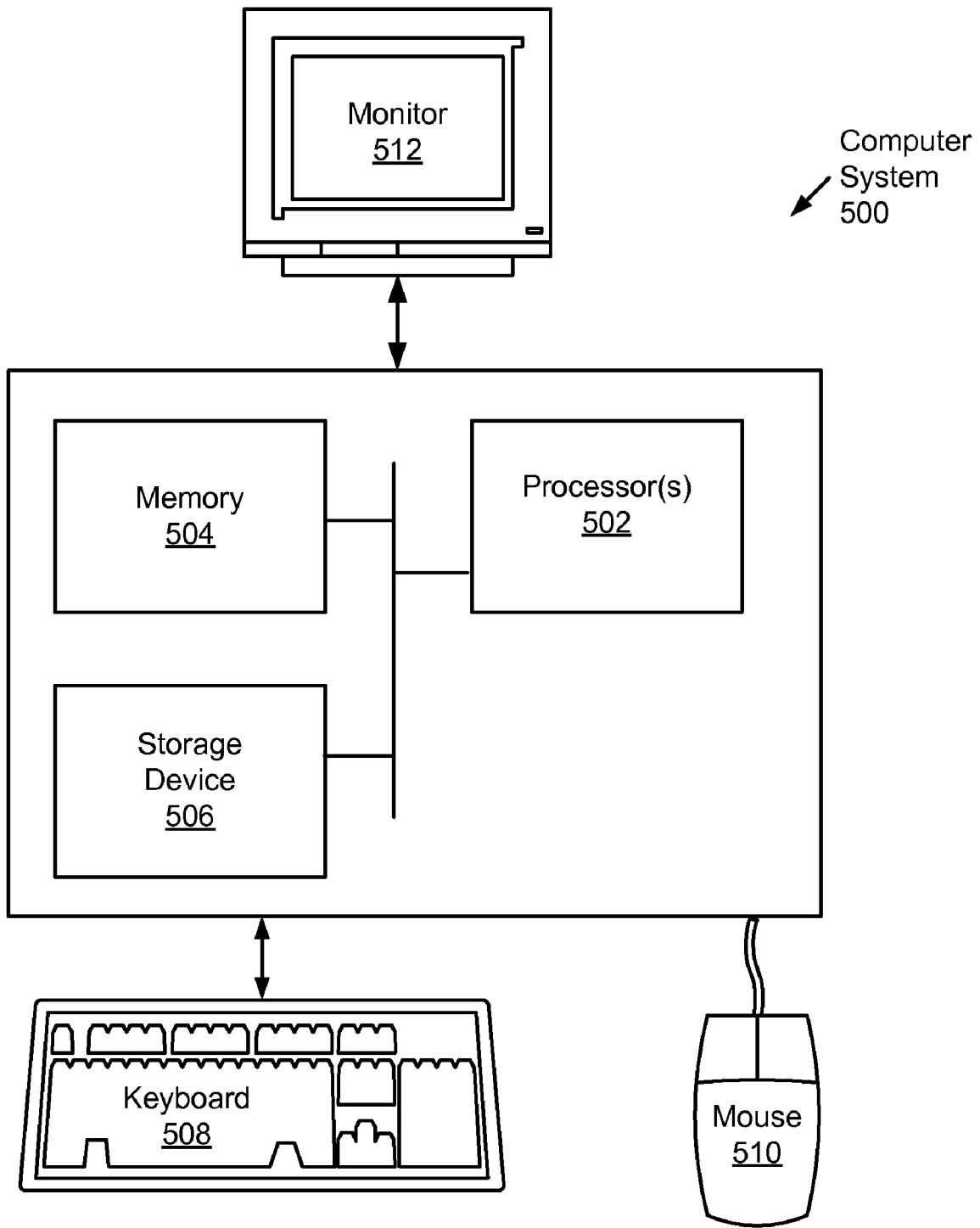
FIG. 5 shows a computer system in accordance with one or more embodiments of the invention.

FIG. 5 shows a computer system (500) in accordance with one or more embodiments of the invention. One or more portions of the invention may be a component in the computer system (500) (e.g., an integrated circuit in the computer system (500)). As shown in FIG. 5, the computer system (500) includes a processor (502), associated memory (504), a storage device (506), and numerous other elements and functionalities typical of today's computers (not shown). The computer system (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (500) may be located at a remote location and connected to the other elements over a network.

One or more embodiments of the invention exhibit one or more of the following advantages. The system and method disclosed herein may increase the bandwidth utilization in situations where one node in the system communicates with few other nodes. Further, the system and method disclosed herein may increase the bandwidth utilization while minimizing overhead due to a path setup procedure. The system and method disclosed herein may also minimize additional power demanded by message forwarding by limiting the number of node hops between the transmitter node and the receiver node.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A system for transmitting data, comprising:
a transmitter node comprising a setup path packet and a plurality of data packets;
a receiver node operatively connected to the transmitter node by a first optical channel (OC); and
a first intermediate node comprising a first forwarding module and operatively connected to the transmitter node by a second OC and to the receiver node by a third OC,
wherein the transmitter node is configured to transmit the setup path packet and a first subset of the plurality of data packets to the first intermediate node using the second OC,
wherein the first forwarding module is configured to relay, in response to receiving the setup packet, the first subset to the receiver node by switching the first subset from the second OC to the third OC,
wherein the receiver node is configured to receive a second subset of the plurality of data packets from the transmitter node using the first OC,
wherein the second OC comprises:
a first waveguide operatively connected to the transmitter node and configured to propagate a signal comprising the first subset using a predetermined wavelength,
a second waveguide operatively connected to the first intermediate node, and
a drop filter operatively connecting the first waveguide with the second waveguide, and configured to identify the signal in the first waveguide based on the predetermined wavelength and route the signal into the second waveguide before the signal reaches the first intermediate node, and
wherein the signal propagates in the third OC using the predetermined wavelength.

2. The system of claim 1, further comprising:
a second intermediate node comprising a second forwarding module and operatively connected to the transmitter node by a fourth OC and to the receiver node by a fifth OC,
wherein the transmitter node is configured to transmit a third subset of the plurality of data packets to the second intermediate node using the fourth OC, and
wherein the second forwarding module is configured to relay the third subset to the receiver node by switching the third subset from the fourth OC to the fifth OC.

3. The system of claim 1, wherein the transmitter node, the first intermediate node, the receiver node, the first waveguide, the second waveguide, and the drop filter are disposed on a chip having a grid, and wherein the first intermediate node and the receiver node are located in a first row of the grid.

4. The system of claim 3, wherein the transmitter node is located in a second row of the grid.

5. The system of claim 3, wherein the first waveguide is located in a waveguide row of the grid, and wherein the second waveguide is located in a waveguide column of the grid.

6. The system of claim 1, wherein the first forwarding module is further configured to send an acknowledgement packet to the transmitter node in response to receiving the setup path packet.

7. The system according to claim 1, wherein the first forwarding module comprises an optical switching array operatively connecting the second OC and the third OC in response to a voltage determined from the setup path packet and applied to the optical switching array.

8. The system of claim 7, wherein the transmitter node further comprises an initialization module configured to monitor for the acknowledgement packet and start transmission of the first subset to the first intermediate node after receiving the acknowledgement packet.

9. The system of claim 8, wherein the initialization module is further configured to transmit a break path packet to the first intermediate node using the second OC to break an indirect optical path comprising the second OC, the third OC, and the first intermediate node.

10. The system of claim 8, wherein the initialization module is further configured to partition the plurality of packets into the first subset and the second subset.

11. A method of transmitting data, comprising:
transmitting a setup path packet from a transmitter node to a first intermediate node comprising a first forwarding module using a first optical channel (OC), wherein the first OC operatively connects the transmitter node and the first intermediate node;
transmitting a first subset of a plurality of data packets from the transmitter node to the first intermediate node using the first OC after transmitting the setup path packet,
wherein transmitting the first subset from the transmitter node to the first intermediate node comprises:
transmitting a signal comprising the first subset using a predetermined wavelength onto a first waveguide operatively connected to the transmitter node, and
routing the signal from the first waveguide to a second waveguide using a drop filter before the signal reaches the first intermediate node,
wherein the second waveguide is operatively connected to the first intermediate node, and
wherein the first OC comprises the first waveguide, the second waveguide, and the drop filter;
transmitting a second subset of the plurality of data packets from the transmitter node to a receiver node using a second OC, wherein the second OC operatively connects the transmitter node to the receiver node; and
relaying the first subset, in response to receiving the setup path packet, to the receiver node by switching the first subset from the first OC to a third OC at the first forwarding module, wherein the third OC operatively connects the first intermediate node and the receiver node, wherein the signal propagates in the third OC using the predetermined wavelength, and
wherein the first OC, the third OC, and the first intermediate node form an indirect optical channel after transmitting the setup path packet.

12. The method of claim 11, further comprising:
transmitting a third subset of the plurality of data packets from the transmitter node to a second intermediate node comprising a second forwarding module using a fourth OC, wherein the fourth OC operatively connects the transmitter node and the second intermediate node; and
relaying the third subset to the receiver node by switching the third subset from the fourth OC to a fifth OC at the second forwarding module, wherein the fifth OC operatively connects the second intermediate node and the receiver node.

13. The method of claim 11, wherein the transmitter node, the first intermediate node, the receiver node, the first waveguide, the second waveguide, and the drop filter are disposed on a chip having a grid, and wherein the first intermediate node and the receiver node are located in a first row of the grid.

14. The method of claim 13, wherein the transmitter node is located in a second row of the grid.

15. The method of claim 11, further comprising:
sending an acknowledgement packet from the first intermediate node to the transmitter node after transmitting the setup path packet.

16. The method of claim 11, further comprising:
sending a break path packet from the transmitter node to the first intermediate node, using the first OC, to terminate the indirect optical path after transmitting the first subset.

17. The method of claim 11, further comprising:
partitioning, at the transmitter node, the plurality of data packets into the first subset and the second subset.

18. The method of claim 11, further comprising:
applying, in response to receiving the setup path packet, a predetermined voltage to an optical switching array located in the first forwarding module, wherein the optical switching array operatively connects the first OC and the third OC in response to applying the predetermined voltage.

* * * * *